(12) United States Patent
Keller et al.

(10) Patent No.: US 10,506,499 B2
(45) Date of Patent: Dec. 10, 2019

(54) INDICATION OF PACKET BASED VOICE SUPPORT IN A MOBILE NETWORK WITH DIFFERENT RADIO ACCESS TECHNOLOGIES

(71) Applicant: Telefonaktiebolaget L M Ericsson (publ), Stockholm (SE)

(72) Inventors: Ralf Keller, Würselen (DE); Afshin Abtin, Sollentuna (SE); Magnus Hallenstål, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 14/910,626

(22) PCT Filed: Aug. 8, 2013

(86) PCT No.: PCT/EP2013/066659
§ 371 (c)(1),
(2) Date: Feb. 5, 2016

(87) PCT Pub. No.: WO2015/018448
PCT Pub. Date: Feb. 12, 2015

(65) Prior Publication Data
US 2016/0183175 A1 Jun. 23, 2016

(51) Int. Cl.
*H04W 48/16* (2009.01)
*H04W 8/24* (2009.01)
*H04W 8/02* (2009.01)

(52) U.S. Cl.
CPC .......... *H04W 48/16* (2013.01); *H04W 8/02* (2013.01); *H04W 8/24* (2013.01)

(58) Field of Classification Search
CPC .......... H04W 48/16; H04W 8/02; H04W 8/24
See application file for complete search history.

(56) References Cited

U.S. PATENT DOCUMENTS

| 2014/0321428 A1* | 10/2014 | Godin | H04W 36/0022 |
| | | | 370/331 |
| 2014/0370886 A1* | 12/2014 | Lisak | H04W 36/0022 |
| | | | 455/426.1 |
| 2015/0011210 A1* | 1/2015 | Drevon | H04W 8/10 |
| | | | 455/435.2 |

FOREIGN PATENT DOCUMENTS

| EP | 2 496 021 A1 | 9/2012 |
| WO | WO 2009/121745 A1 | 10/2009 |

(Continued)

OTHER PUBLICATIONS

3GPP2 X.S0042-A, Version 1.0, "Voice Call Continuity between IMS and Circuit Switched Systems", Date: Aug. 2008.*

(Continued)

*Primary Examiner* — Derrick W Ferris
*Assistant Examiner* — Farhad Ali
(74) *Attorney, Agent, or Firm* — Sage Patent Group

(57) ABSTRACT

A mobile network provides first accesses implemented by a first radio access technology and second accesses implemented by a second radio access technology, which is different from the first radio access technology. A network node controls one or more of the first accesses records at least one mobility event. The mobility event corresponds to movement of a user equipment from one of the first accesses controlled by the network node to one of the second accesses. Further, the network node receives a query from a further network node. Depending on the recorded at least one mobility event, the network node responds to the query with an indication whether voice communication over packet switched access is supported for the user equipment.

15 Claims, 10 Drawing Sheets

(56) References Cited

FOREIGN PATENT DOCUMENTS

| WO | WO 2011/000672 A1 | 1/2011 | |
|---|---|---|---|
| WO | WO 2013110777 A1 * | 8/2013 | .............. H04W 8/10 |

OTHER PUBLICATIONS

International Search Report, Application No. PCT/EP2013/066659, dated Jul. 8, 2014.
Written Opinion of the International Searching Authority, Application No. PCT/EP2013/066659, dated Jul. 8, 2014.
3GPP, Technical Specification—"3rd Generation Partnership Project; Technical Specification Group Services and System Aspects; Network architecture (Release 12)", 3GPP TS 23.002 V12.1.0 (Dec. 2012), 105 pp.
3GPP, Technical Specification—3rd Generation Partnership Project; Technical Specification Group Core Network and Terminals; Organization of subscriber data (Release 12), 3GPP TS 23.008 V12.0.1 (Jun. 2013), 111 pp.
3GPP, Technical Specification—3rd Generation Partnership Project; Technical Specification Group Services and System Aspects; General Packet Radio Service (GPRS); Service description; Stage 2 (Release 11), 3GPP TS 23.060 V11.4.0 (Dec. 2012), 335 pp.
3GPP, Technical Specification—"3rd Generation Partnership Project; Technical Specification Group Services and System Aspects; General Packet Radio Service (GPRS); Service description; Stage 2 (Release 12)", 3GPP TS 23.060 V12.1.0 (Jun. 2013), 338 pp.
3GPP, Technical Specification—"3rd Generation Partnership Project; Technical Specification Group Services and System Aspects; IP Multimedia Subsystem (IMS); Stage 2 (Release 12)", 3GPP TS 23.228 V12.1.0 (Jun. 2013), 296 pp.
3GPP, Technical Specification—"3rd Generation Partnership Project; Technical Specification Group Services and System Aspects; IP Multimedia Subsystem (IMS) Service Continuity; Stage 2 (Release 12)", 3GPP TS 23.237 V12.2.0 (Mar. 2013), 169 pp.
3GPP, Technical Specification—"3rd Generation Partnership Project; Technical Specification Group Services and System Aspects; IP Multimedia Subsystem (IMS) centralized services; Stage 2 (Release 12)", 3GPP TS 23.292 V12.0.0 (Dec. 2012), 119 pp.
3GPP, Technical Specification—"3rd Generation Partnership Project; Technical Specification Group Services and System Aspects; IP Multimedia Subsystem (IMS) centralized services; Stage 2 (Release 12)", 3GPP TS 23.292 V12.1.0 (Mar. 2013), 120 pp.
3GPP, Technical Specification—"3rd Generation Partnership Project; Technical Specification Group Services and System Aspects; IP Multimedia Subsystem (IMS) centralized services; Stage 2 (Release 12)", 3GPP TS 23.292 V12.2.0 (Jun. 2013), 120 pp.
3GPP, Technical Specification—"3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.4.0 (Dec. 2012), 284 pp.
3GPP, Technical Specification—"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.1.0 (Jun. 2013), 291 pp.
3GPP, Technical Specification—"3rd Generation Partnership Project; Technical Specification Group Services and System Aspects; Architecture enhancements for non-3GPP accesses (Release 11)", 3GPP TS 23.402 V11.5.0 (Dec. 2012), 252 pp.
3GPP, Technical Specification—"3rd Generation Partnership Project; Technical Specification Group Services and System Aspects; Architecture enhancements for non-3GPP accesses (Release 12)", 3GPP TS 23.402 V12.1.0 (Jun. 2013), 254 pp.
3GPP, Technical Specification—"3rd Generation Partnership Project; Technical Specification Group Core Network and Terminals; IMS multimedia telephony communication service and supplementary services; Stage 3 (Release 11)", 3GPP TS 24.173 V11.5.0 (Mar. 2013), 17 pp.

* cited by examiner

INDICATION OF PACKET BASED VOICE SUPPORT IN A MOBILE NETWORK WITH DIFFERENT RADIO ACCESS TECHNOLOGIES

CROSS REFERENCE TO RELATED APPLICATION

This application is a 35 U.S.C. § 371 national stage application of PCT International Application No. PCT/EP2013/066659, filed on Aug. 8, 2013, the disclosure and content of which is incorporated by reference herein in its entirety. The above-referenced PCT International Application was published in the English language as International Publication No. WO 2015/018448 A1 on Feb. 12, 2015.

TECHNICAL FIELD

The present invention relates to methods of controlling voice communication of a user equipment in a mobile network and to corresponding devices or systems.

BACKGROUND

Mobile networks are currently evolving from pure circuit switched (CS) networks towards packet switched (PS) networks, in particular Internet Protocol (IP) based networks, and by that integrate into IP based infrastructures that are also used for the Internet, the World Wide Web, and the datacom industry.

More specifically, technologies allowing voice communication over an IP based network have been introduced. Examples of such technologies are Voice over IP (VoIP) via Digital Subscriber Line (DSL) access or Voice over IP via Wireless Local Area Network (WLAN) access. Also in some mobile networks, technologies which allow voice communication over an IP based network are available. Examples of such mobile networks are mobile networks as specified by the $3^{rd}$ Generation Partnership Project (3GPP). For example, a mobile network may implement an IP Multimedia Subsystem (IMS) as specified in 3GPP Technical Specification (TS) 23.228 V12.1.0 and offer voice communication as an IMS service.

Further, a concept referred to as IMS Centralized Services (ICS) has been introduced which allow for utilizing IMS services over various types of access networks, including not only PS access networks, but also CS access networks. The ICS concept is for example specified in 3GPP TS 23.292 V12.1.0. Using the ICS concept, the IMS voice services may be available via various kinds of radio access technology (RAT), such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EG-PRS), Universal Mobile Telecommunications System (UMTS), and High Speed Packet Access (HSPA). Voice communication with a user equipment (UE) which is connected to the mobile network via a CS access network may then be routed through the IMS.

For scenarios where IMS services are usable by a UE both via PS access networks and via CS access networks, a mechanism referred to as Terminating Access Domain Selection (T-ADS) was introduced to select between multiple possible access types for terminating a call to a UE. The T-ADS mechanism is for example specified in 3GPP TS 23.401 V12.1.0, 23.060 V12.1.0, and 23.292 V12.2.0. According to these specifications, T-ADS may be implemented by a Service Centralization and Continuity Application Server (SCC AS) as for example specified in 3GPP TS 23.237 V12.2.0. The T-ADS functionality of the SCC AS may apply various criteria for selecting between a CS access network or PS access network for terminating an incoming voice session. For example, the SCC AS may obtain capabilities of the most recently used PS access network, e.g., in the form of an "IMS voice over PS session supported indication" and current RAT type, from a Home Subscriber Server (HSS) by 3GPP.

However, the network-assisted T-ADS is currently specified only within the 3GPP technology framework. Accordingly, for networks combining a 3GPP RAT, such as LTE, with a non-3GPP RAT, such as a CDMA2000 RAT, the network assisted T-ADS are not satisfactory. This may result in an excessive number of termination re-tries and longer call setup time, or even call setup failure. Further, the T-ADS mechanism as specified for 3GPP networks cannot be extended in a straightforward manner to the non-3GPP access technologies because the network architecture and procedures applied for such non-3GPP access technologies, e.g., concerning mobility management, may differ significantly from the 3GPP technology. For example, control nodes of such non-3GPP RAT may not interact with the 3GPP HSS. Accordingly, when the UE is attached to a non-3GPP the HSS may not be able to provide the required information for the appropriate T-ADS decision.

Accordingly, there is a need for techniques which allow for efficiently controlling communication of a UE in a mobile network which provides accesses which are based on such different kinds of RAT.

SUMMARY

According to an embodiment of the invention, a method for controlling communication of a UE in a mobile network is provided. The mobile network provides first accesses implemented by a first RAT and second accesses implemented by a second RAT. According to the method, a network node controlling one or more of the first accesses records at least one mobility event. The mobility event corresponds to movement of the UE from one of the first accesses controlled by the network node to one of the second accesses. Further, the network node receives a query from a further network node. Depending on the recorded at least one mobility event, the network node responds to the query with an indication whether voice communication over packet switched access is supported for the UE.

According to a further embodiment of the invention, a method for controlling communication of a UE in a mobile network is provided. The mobile network provides first accesses implemented by a first RAT and second accesses implemented by a second RAT. According to the method, a network node records an indication of a time when the UE attached to one of the second accesses. Further, the network node receives a first query from a first further network node. In response to the first query, the network node sends a second query to a second further network node controlling one or more of the first accesses. In response to the second query, the network node receives an indication of a time when the UE attached to one of the first accesses controlled by the second further network node. Depending on the received indications, the network node responds to the first query with an indication whether voice communication over packet switched access is supported for the UE.

According to a further embodiment of the invention, a network node for a mobile network is provided. The mobile network provides first accesses implemented by a first RAT and second accesses implemented by a second RAT. The network node comprises a first interface for controlling one or more of the first accesses. Further, the network node comprises a second interface for interacting with a further network node of the mobile network. Further, the network node comprises at least one processor. The at least one processor is configured to record at least one mobility event corresponding to movement of a UE from one of the first accesses controlled by the network node to one of the second accesses. Further, the processor is configured to receive a query from the further network node and, depending on the recorded at least one mobility event, respond to the query with an indication whether voice communication over packet switched access is supported for the UE.

According to a further embodiment of the invention, a network node for a mobile network is provided. The mobile network provides first accesses implemented by a first RAT and second accesses implemented by a second RAT. The network node comprises at least one interface for interacting with at least one further network node of the mobile network. Further, the network node comprises at least one processor. The at least one processor is configured to record an indication of a time when a UE attached to one of the second accesses. Further, the at least one processor is configured to receive a first query from a first further network node and, in response to the first query, send a second query to a second further network node controlling one or more of the first accesses. Further, the at least one processor is configured to receive, in response to the second query, an indication of a time when the UE attached to one of the first accesses controlled by the second further network node and, depending on the received indications, respond to the first query with an indication whether voice communication over packet switched access is supported for the UE.

According to a further embodiment of the invention, a computer program is provided. The computer program comprises program code to be executed by at least one processor of a network node of a mobile network. The mobile network provides first accesses implemented by a first RAT and second accesses implemented by a second RAT. Execution of the program code causes the network node to record at least one mobility event corresponding to movement of a UE from one of the first accesses controlled by the network node to one of the second accesses. Further, execution of the program code causes the network node to receive a query from the further network node and, depending on the recorded at least one mobility event, respond to the query with an indication whether voice communication over packet switched access is supported for the UE.

According to a further embodiment of the invention, a computer program is provided. The computer program comprises program code to be executed by at least one processor of a network node of a mobile network. The mobile network provides first accesses implemented by a first RAT and second accesses implemented by a second RAT. Execution of the program code causes the network node to record an indication of a time when a UE attached to one of the second accesses. Further, execution of the program code causes the network node to receive a first query from a first further network node and, in response to the first query, send a second query to a second further network node controlling one or more of the first accesses. Further, execution of the program code causes the network node to receive, in response to the second query, an indication of a time when the UE attached to one of the first accesses controlled by the second further network node and, depending on the received indications, respond to the first query with an indication whether voice communication over packet switched access is supported for the UE.

DETAILED DESCRIPTION OF EMBODIMENTS

In the following, the invention will be explained in more detail by referring to exemplary embodiments and to the accompanying drawings. The illustrated embodiments relate to controlling communication of a UE in a mobile network providing different RATs, in particular a 3GPP LTE RAT implementing PS accesses and a CDMA2000 RAT. The CDMA2000 RAT may for example provide CS accesses, such as based on the CDMA2000 1×RTT specifications, and/or PS accesses, such as based on the CDMA2000 1×EVDO specifications. In a typical deployment, the CS accesses may be used for voice services and the PS accesses may be used for broadband data.

In the illustrated example, it is assumed that the interaction between control nodes of the different RATs is only limited. For example, in the above-mentioned example of 3GPP LTE RAT and CDMA2000 RAT, such limitation may be due to the RATs being subject to standardization by different bodies.

Figure 1:
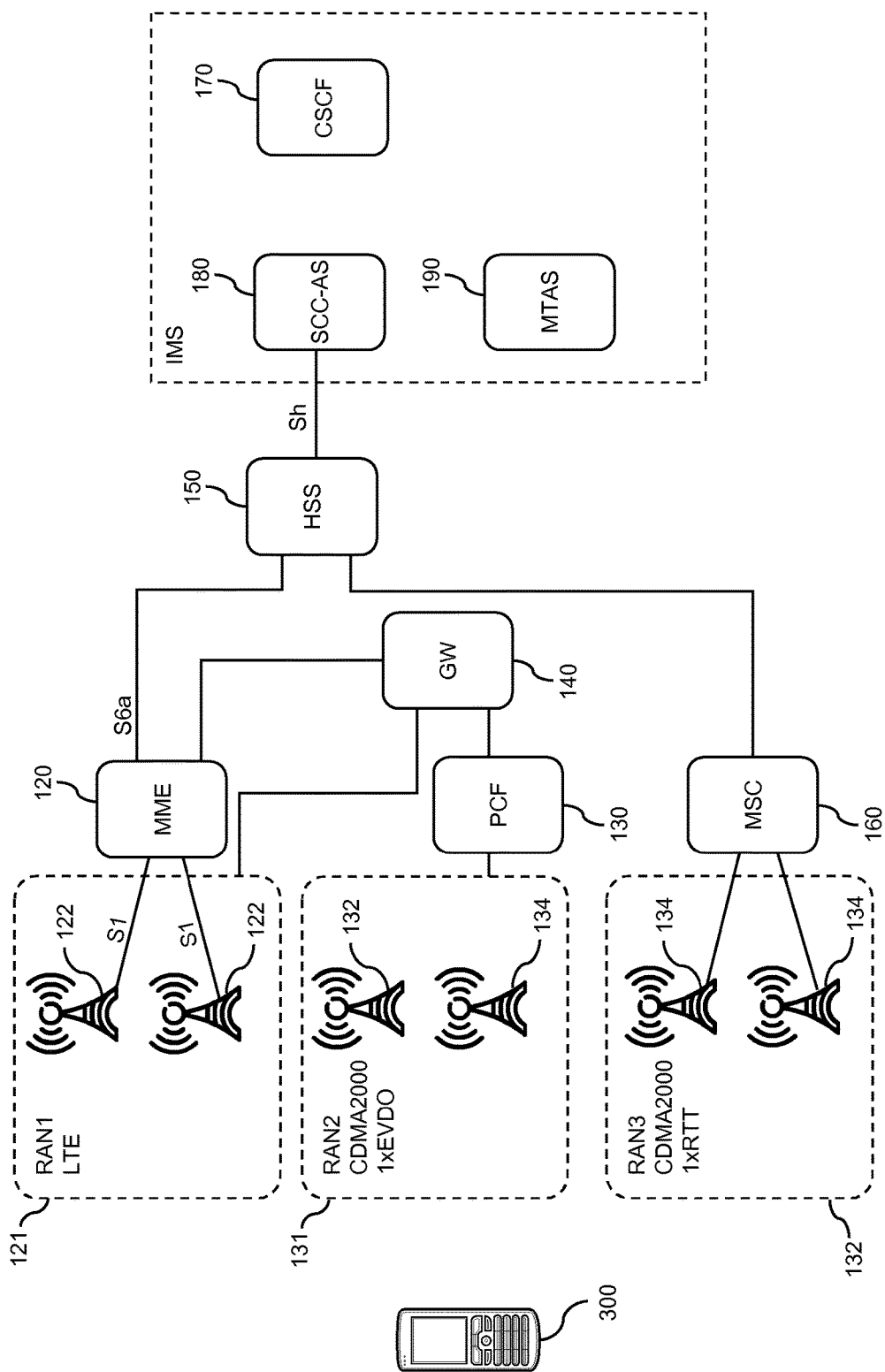
FIG. 1 schematically illustrates a mobile network architecture in which concepts according to an embodiment of the invention may be implemented.

FIG. 1 schematically illustrates a part of the mobile network architecture. Specifically, FIG. 1 shows a first radio access network (RAN) 121 which is based on LTE RAT, also referred to as E-UTRA (Evolved UMTS Radio Access). The first RAN provides LTE accesses 122, each typically implemented by an LTE base station referred to as eNB. Further, FIG. 1 shows a second RAN 131 and a third RAN 133, each based on CDMA2000 RAT. In the example of FIG. 1, the second RAN 131 is assumed to be implemented by CDMA2000 1×EVDO RAT, which is a PS access technology, and the third RAN 133 is assumed to be implemented by CDMA2000 1×RTT RAT, which is a CS access technology. The third RAN 133 provides CDMA2000 1×RTT accesses 134, which are typically used to provide CS voice connectivity, whereas the second RAN 131 provides CDMA2000 1×EVDO accesses 132 which are typically used to provide PS data connectivity. A network architecture using such types of different RANs is typical for regions in which a third generation (3G) mobile network is implemented on the basis of CDMA2000 technology and supplemented by the LTE RAT for fast broadband data access.

The PS access functionalities of the first RAN 121 are controlled by a control node 120 referred to as Mobility Management Entity (MME). The PS access functionalities of the second RAN 131 are controlled by a control node 130 referred to as Packet Control Function (PCF). The CS access functionalities of the third RAN 133 are controlled by a further control node 160 referred to as Mobile Switching Center (MSC). The control nodes 120, 130, 160 may in particular be responsible for the management and establishment of communication sessions via the respective RAN 121, 131, 133, and for managing mobility between the accesses 122, 132, 134 of the respective RAT. However, mobility management functionalities between the LTE RAT and the CDMA2000 RATs are assumed to be limited.

In addition, FIG. 1 illustrates additional network nodes, which are used for providing one or more services to a UE 300. Specifically, such services may include packet based voice communication as provided by the IMS. The IMS nodes illustrated in FIG. 1 include a session a call session control node 170, a continuity application server 180, and other application servers, e.g., a multimedia application server 190. The call session control node 170 may be implemented as a Call Session Control Function (CSCF), which may include the Proxy CSCF (P-CSCF), the Serving CSCF (S-CSCF), and/or the Interrogating CSCF (I-CSCF) subfunctions. In the following, the call session control node 170 will also be referred to as CSCF 170. Unless described otherwise, the session continuity application server 180 may implement functionalities of an SCC AS according to 3GPP TS 23.237 V12.2.0 and 23.292 V12.2.0. Specifically, the SCC AS may implement T-ADS functionalities. In the following, the session continuity application server 180 will therefore also be referred to as SCC AS. Further functionalities of the session continuity application server 180, which are specific to the concepts as described herein, will be described below. The multimedia application server 190 may be a Multimedia Telephony Application Server (MTAS) according to 3GPP TS 24.173 V11.5.0.

Other network nodes illustrated by FIG. 1 include a subscriber database 150 and a gateway (GW) 140. The gateway may for example implement functionalities of a Packet Data Network Gateay (PGW) or of a Serving Gateway (SGW) as for example specified in 3GPP TS 23.002 and 23.401. The subscriber database 150 is configured to store subscriber data. For this purpose, the subscriber database is associated with a particular subscription associated with the UE 300, e.g., by inserting a Subscriber Identity Module (SIM) card of a subscriber into the UE 300. In other words, the subscriber database 150 is a uniquely defined location for storing data relating to a particular subscriber. The subscriber database 150 may be implemented as a Home Subscriber Server (HSS) according to 3GPP TS 23.002 V12.1.0 and 23.008 V12.0.1. In the following, the subscriber database 150 will also be referred to as HSS 150. Further functionalities of the subscriber database 150, which are specific to the concepts as described herein, will be described below.

The network nodes may be coupled to each other as illustrated in FIG. 1. For this purpose, corresponding interfaces are provided between the different network nodes. For example, the MME 120 may be coupled to the LTE network accesses 122 of the first RAN 121 using the S1 interface. The MME 120 may be coupled to the HSS 150 using the S6a interface. Between the MME 120 and the gateway 140, for example the S11 interface as specified between the SGW and MME nodes may be used. The SCC AS 160 may be coupled to the HSS 150 using the Sh interface. As further illustrated, also an interface between the MSC 160 and the HSS 150 may be provided. Such interface may for example be implemented using the RADIUS or Diameter protocol.

The UE 300 as illustrated in FIG. 1 may be any type of mobile communication device, e.g., a mobile phone, a portable computer, or the like. It is assumed that the UE 300 is capable of using different RAT types, in particular the above-mentioned LTE RAT, the CDMA2000 1×EVDO RAT, and the CDMA2000 1×RTT RAT. Mobility of the UE 300 may occur in connected mode, i.e., while the UE 300 maintains a data or voice session with the mobile network, or in idle mode, i.e., while the UE 300 is registered in a certain RAN 121, 131, 133, but has no ongoing voice or data connection.

Due to the mobility of the UE 300 between the different RAT types, also the capabilities supported for the UE 300 may vary. For example, voice communication over PS access, in particular IMS voice over PS session, may be supported or unsupported for certain LTE accesses 122. In the CDMA2000 accesses 132, 134 this capability is in turn not supported. To allow efficient termination of voice calls by the SCC AS 180, it is therefore beneficial to provide the SCC AS 180 with information on the access to which the UE 300 is currently attached, also in the cases where this access is implemented by CDMA2000 RAT.

According to the concepts as further explained in the following, this may be achieved by configuring the MME 120 to record mobility events in which the UE 300 leaves one of the LTE accesses 122 controlled by the MME 120, e.g., to one of the CDMA2000 1×EVDO accesses 132 or one of the CDMA2000 1×RTT accesses 134. Further, the MME 120 may also record mobility events on which the UE 300 moves to one of the LTE accesses 122, e.g., from one of the CDMA2000 1×EVDO accesses 132 or one of the CDMA2000 1×RTT accesses 134. The recorded mobility events 120 in the MME 120 may be used to assess whether the UE 300 is currently on an LTE access 132 or on one of the other accesses. The HSS 150 may obtain such information from the MME 120, e.g., by sending a query for the support of voice communication over PS access to the MME 120, which may then evaluate the recorded mobility events for the UE 300. The recorded mobility event information in the MME 120 allows for more precisely assessing the access dependent supported capabilities, without relying on detailed information from the CDMA2000 RANs 131, 133. As further explained below, the way of detecting and recording the mobility event may vary depending on the type of mobility event. In some implementations, the HSS 150 may further be configured to store the time of the UE 300 attaching to one of the CDMA2000 1×RTT accesses, to thereby better address certain scenarios of idle mode mobility between the LTE RAT and the CDMA2000 1×RTT RAT.

Figure 2:
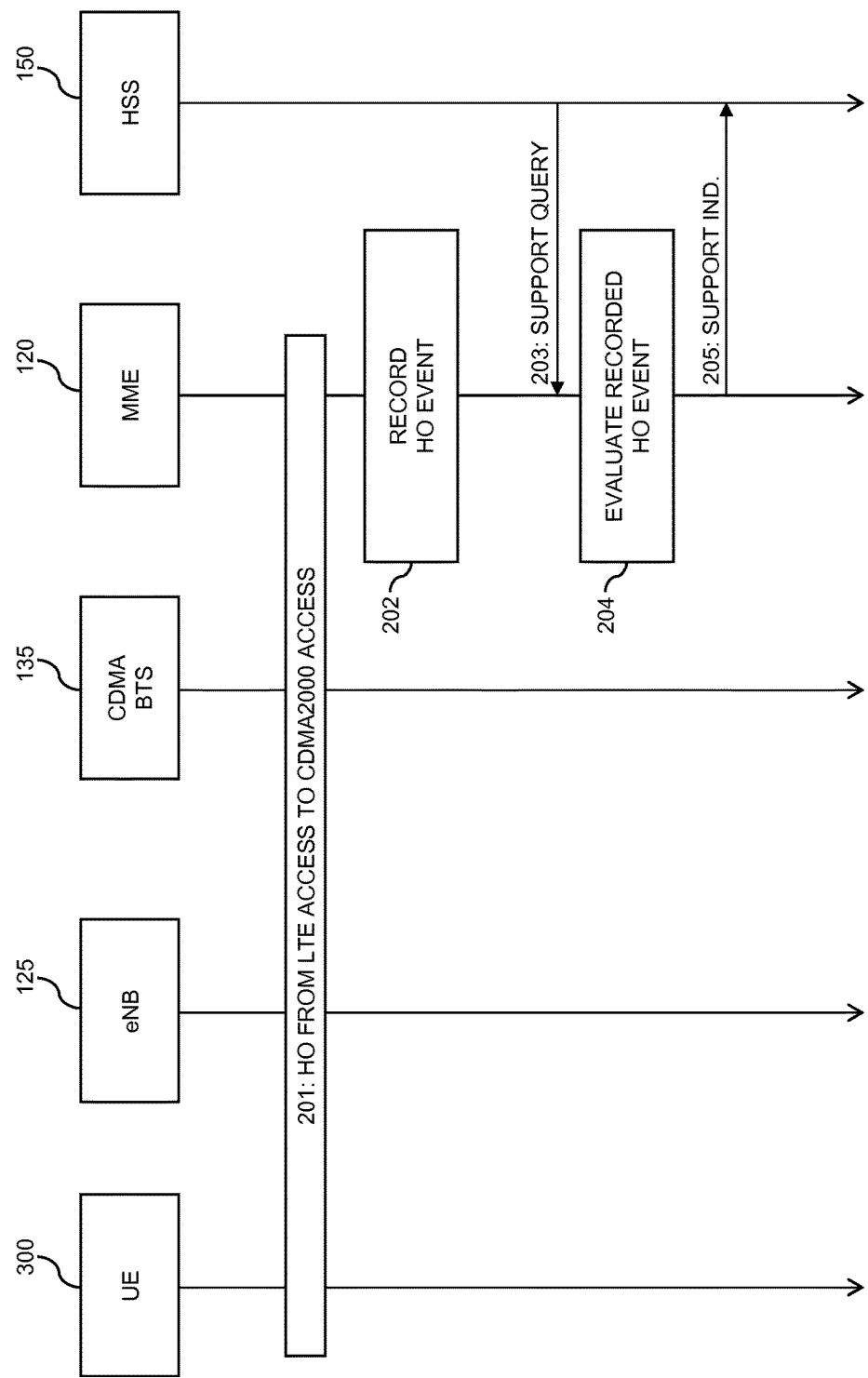
FIG. 2 shows exemplary procedures in accordance with an embodiment of the invention, in which a UE performs a connected mode handover from and LTE access to a CDMA2000 access.

FIG. 2 shows exemplary procedures for illustrating the above concepts in the case of connected mode mobility of the UE 300 from one of the LTE accesses 122 to one of the CDMA2000 accesses 132, 134. The procedures of FIG. 2 involve the UE 300, an eNB 125 providing the LTE access, a CDMA2000 Base Transceiver System (BTS) 135 providing the CDMA2000 access, the MME 120, and the HSS 150. The CDMA2000 access may be either a CDMA2000 1×EVDO access or a CDMA2000 1×RTT access. For the LTE accesses controlled by the MME 120, support of IMS voice over PS session is assumed to be homogeneous, i.e., present for all LTE accesses in the Tracking Area (TA) list controlled by the MME 120. As specified in 3GPP TS 23.401, the MME 120 may determine the support when the UE 300 initially attaches to one of the LTE accesses controlled by the MME 120 or when performing a TA update (TAU). Further, the MME 120 may record the time of the initial attach or TAU. Further, an indication that IMS voice over PS session is supported homogeneously may be provided from the MME 120 to the HSS 150.

In this situation, the UE 300 may perform a HO from the LTE access to the CDMA2000 access. If the CDMA2000 access is a CDMA2000 1×RTT access and the UE 300 is engaged in a voice call, a voice call continuity (VCC) mechanism as specified in 3GPP TS 23.216 V11.9.0 may be applied, resulting in the PS bearers established via the LTE access being suspended under control of the MME 120. Accordingly, the MME 120 is actively involved in the HO process and becomes aware of the HO. If the CDMA2000 access is a CDMA2000 1×EVDO access, the HO according to 3GPP TS 23.402 V12.1.0 may be performed. Since the MME 120 is involved in these HO procedures, it will become aware of the HO.

At step 202 the MME 120 records the HO event. Specifically, the MME 120 may record the time of the HO, e.g., in the form of a timestamp. Further, the MME 120 may record information on the new RAT type, e.g., that the new RAT type is CDMA2000 1×RTT, or "not LTE". Still further, the MME 120 may record that IMS voice over PS session is not supported for the UE 300.

If the MME 120 subsequently receives a query 203 from the HSS 150 for the support of IMS voice over PS session for the UE 300, the MME 120 may evaluate the recorded HO event, as indicated by step 204. Depending on the evaluation, the MME 120 may then respond to the query 203 by sending an indication of the support of IMS voice over PS session for the UE 300. In the illustrated example, the MME 120 would indicate that IMS voice over PS session is not supported.

Figure 3:
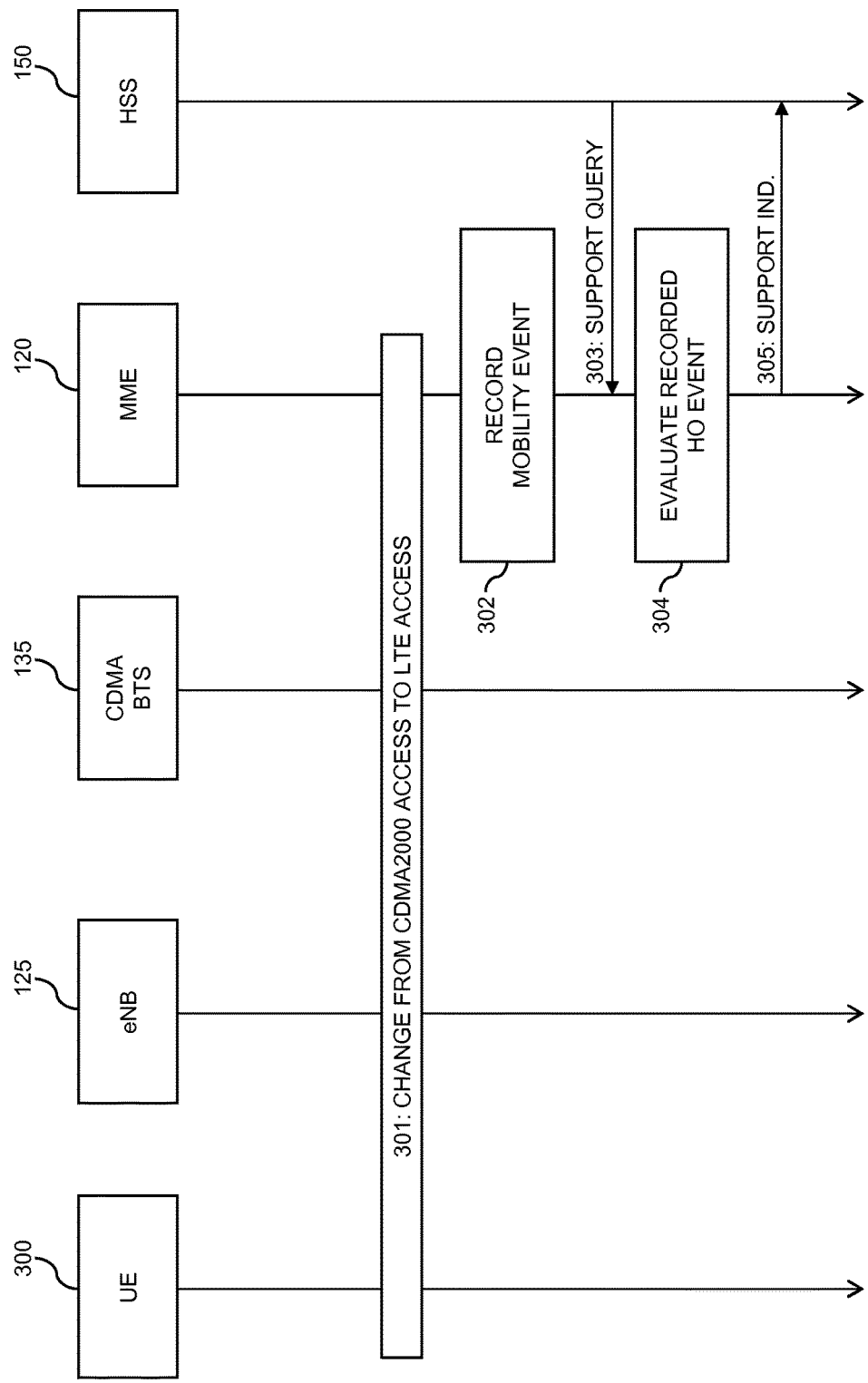
FIG. 3 shows exemplary procedures in accordance with an embodiment of the invention, in which a UE changes from a CDMA2000 access to an LTE access.

FIG. 3 shows exemplary procedures for illustrating the above concepts in the case of mobility of the UE 300 from one of the CDMA2000 accesses 132, 134 to one of the LTE accesses 122 controlled by the MME 120. The procedures of FIG. 3 involve the UE 300, an eNB 125 providing the LTE access, a CDMA2000 BTS 135 providing the CDMA2000 access, the MME 120, and the HSS 150. The CDMA2000 access may be either a CDMA2000 1×EVDO access or a CDMA2000 1×RTT access. Again, support of IMS voice over PS session is assumed to be homogeneous for the LTE accesses controlled by the MME 120.

At step 301, the UE 300 moves from the CDMA2000 access to the LTE access. If the CDMA2000 access is a CDMA2000 1×RTT access, this may for example be after moving to the CDMA2000 access under VCC, e.g., as in the procedures of FIG. 2, and the voice call is terminated. This will result in the UE 300 performing a TAU to resume the previously suspended PS bearers. Accordingly, the MME 120 may become aware of the mobility event, even if it occurs in idle mode. If the CDMA2000 access is a CDMA2000 1×EVDO access, the movement to the LTE access may for example be a HO according to 3GPP TS 23.402. Accordingly, the MME 120 is involved in the HO process and becomes aware of the HO.

At step 302 the MME 120 records the mobility event. Specifically, the MME 120 may record the time of the moving to the LTE access, e.g., in the form of a timestamp. Further, the MME 120 may record information on the new RAT type, e.g., that the new RAT type is LTE. Still further, the MME 120 may record that IMS voice over PS session is supported for the UE 300.

If the MME 120 subsequently receives a query 303 from the HSS 150 for the support of IMS voice over PS session for the UE 300, the MME 120 may evaluate the recorded mobility event, as indicated by step 304. Depending on the evaluation, the MME 120 may then respond to the query 303 by sending an indication of the support of IMS voice over PS session for the UE 300. In the illustrated example, the MME 120 would indicate that IMS voice over PS session is supported.

Figure 4:
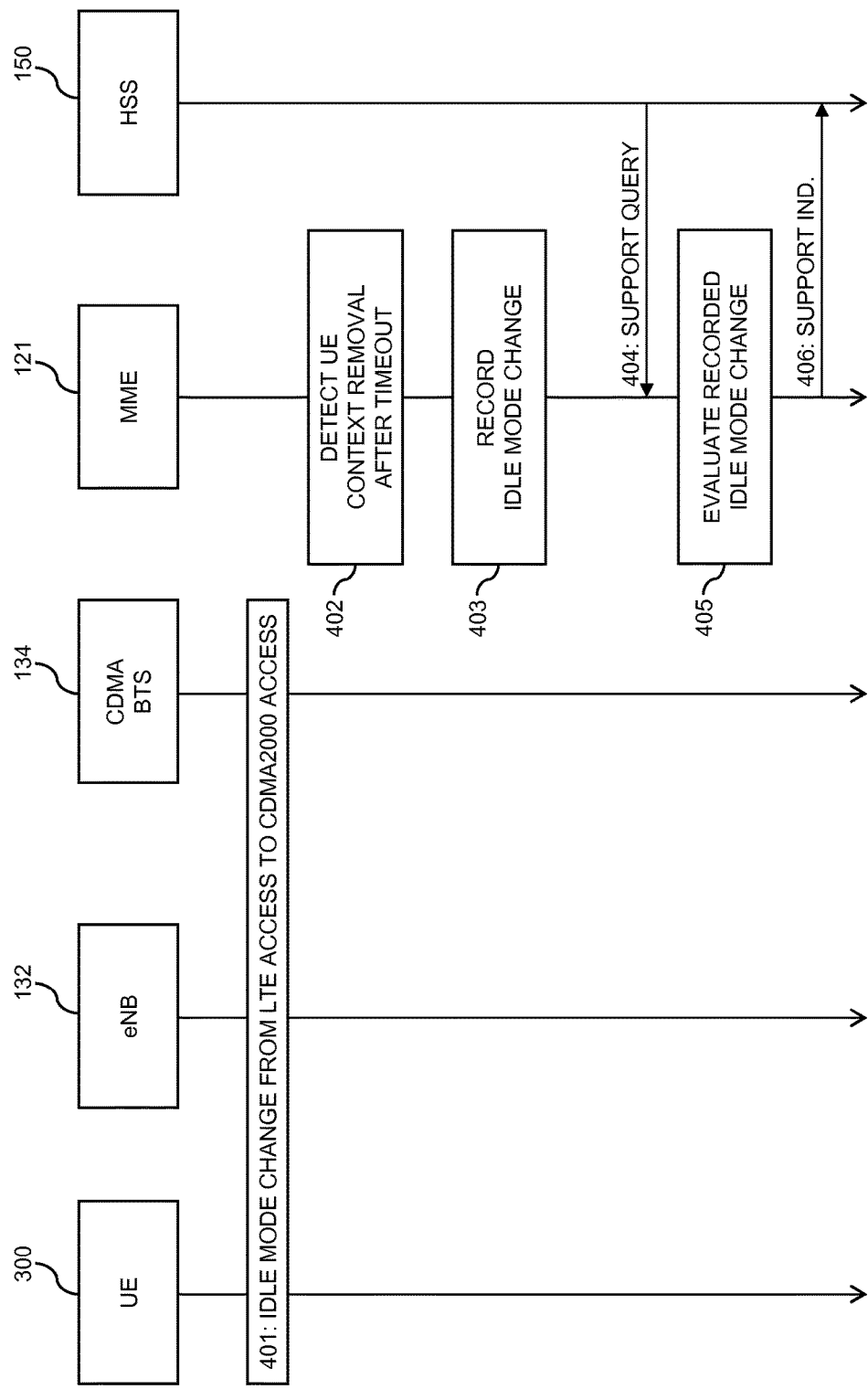
FIG. 4 shows exemplary procedures in accordance with an embodiment of the invention, in which a UE performs an idle mode change from an LTE access to a CDMA2000 access.

FIG. 4 shows exemplary procedures for illustrating the above concepts in the case of idle mode mobility of the UE 300 from one of the LTE accesses 122 controlled by the MME 120 to one of the CDMA2000 1×RTT 134. The procedures of FIG. 4 involve the UE 300, an eNB 125 providing the LTE access, a CDMA2000 BTS 135 providing the CDMA2000 1×RTT access, the MME 120, and the HSS 150. The CDMA2000 access may be either a CDMA2000 1×EVDO access or a CDMA2000 1×RTT access.

At step 401, the UE 300 moves from the LTE access to the CDMA2000 1×RTT access, however without being engaged in a voice call. In such situations, the PGW which served the UE 300 on the LTE access will detect inactivity of the UE 300 and remove the UE context after expiry of an inactivity timer, which is indicated to the MME 120. A further timer is implemented at the MME 120 to initiate a detach of the UE 300 from the LTE access after expiry of the further timer. Accordingly, the timers may be utilized at the MME 120 to detect the idle mode change from the LTE access to the CDMA2000 access. Specifically, the MME 120 may regard the context removal, if performed before timer-initiated detach, as an indication of the idle mode change to the CDMA 1×RTT access. If the detach is performed, the MME 120 will typically perform a de-registration for the UE 300 in the HSS 150, so that future queries for the UE 300 are not directed to the MME 120.

At step 402 the MME 120 records the mobility event. Specifically, the MME 120 may record the time of the context removal as time of leaving the LTE access, e.g., in the form of a timestamp. Further, the MME 120 may record information on the new RAT type, e.g., that the new RAT type is CDMA2000 1×RTT or "not LTE". Still further, the MME 120 may record that IMS voice over PS session is not supported for the UE 300.

If the MME 120 subsequently receives a query 403 from the HSS 150 for the support of IMS voice over PS session for the UE 300, the MME 120 may evaluate the recorded mobility event, as indicated by step 404. Depending on the evaluation, the MME 120 may then respond to the query 403 by sending an indication of the support of IMS voice over PS session for the UE 300. In the illustrated example, the MME 120 would indicate that IMS voice over PS session is not supported.

Figure 5:
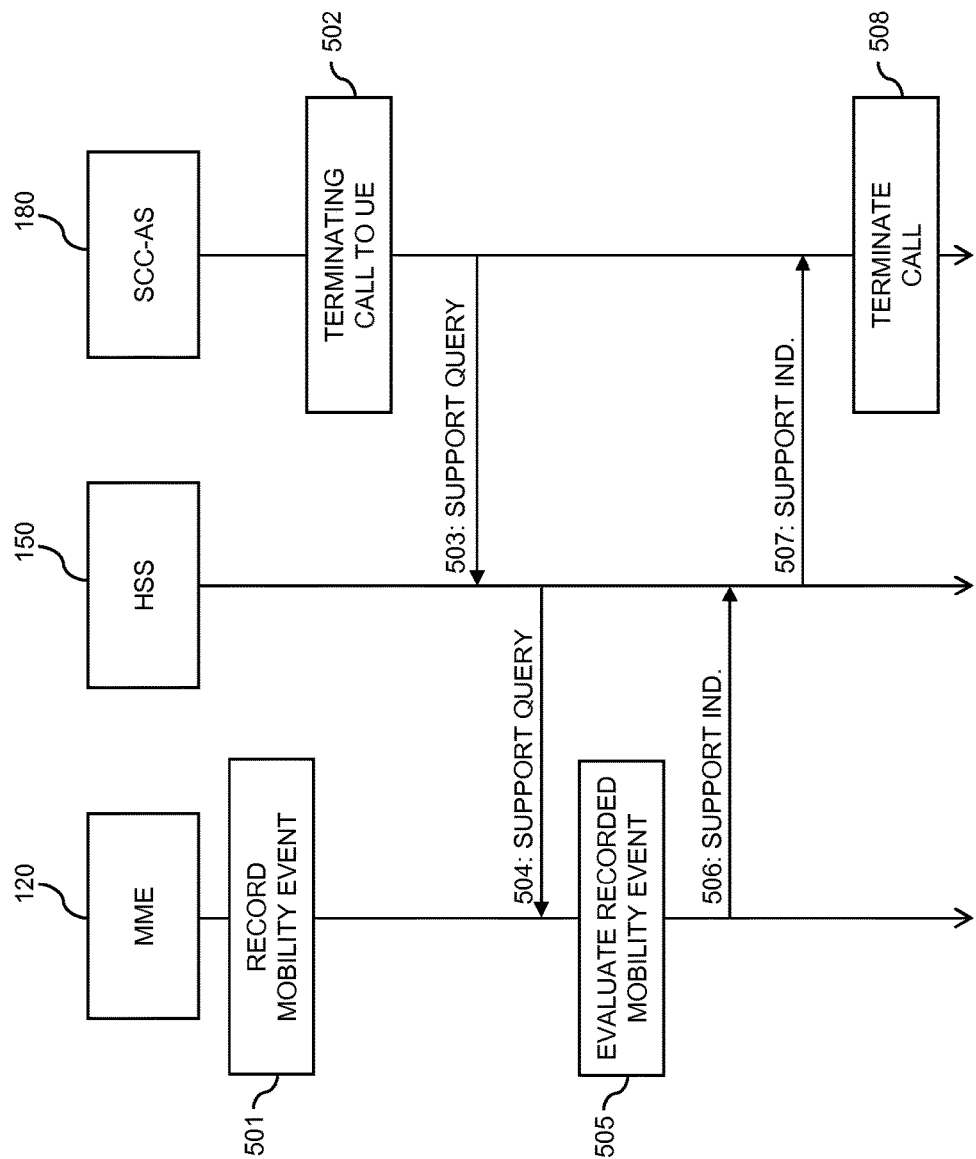
FIG. 5 shows exemplary procedures in accordance with an embodiment of the invention, which involve termination of a voice call to the UE.

FIG. 5 shows exemplary procedures for illustrating termination of a call to the UE 300 by the SCC AS 180. The procedures of FIG. 5 involve the MME 120, the HSS 150, and the SCC AS 180.

At step 501, the MME 120 records a mobility event. This may for example be accomplished in a procedures as explained in connection with FIG. 2, 3 or 4. As mentioned above, various information concerning the mobility event may be recorded, e.g., an indication of the time of the mobility event, the new RAT after the mobility event, or new status for the support of IMS voice over PS session after the mobility event.

As indicated by step 502, the SCC AS 180 may then need to terminate a voice call to the UE 300.

To obtain information for terminating the voice call, the SCC AS 180 sends a support query 503 to the HSS 150. The HSS 150 sends a further support query 504 to the MME 120.

At step 505, the MME 120 evaluates the recorded mobility event and, depending on the evaluation, responds to the query 504 with a support indication 506. Specifically, the support indication indicates whether IMS voice over PS session is supported for the UE 300 or not. The HSS 150 forwards the indicated support information to the SCC AS 180, by sending a further support indication 507 to the SCC AS 180. In some cases, the HSS 150 may also process the indicated support information before sending the further support indication to the SCC AS 180, e.g., by taking into account information stored at the HSS 150 or indicated by other nodes.

At step 508, the SCC AS 180 terminates the voice call according to the indicated support information. Specifically, if the indicated support information shows support of IMS voice over PS session, the SCC AS 180 may select termination over PS access. Alternatively, if the indicated support information shows no support of IMS voice over PS session, the SCC AS 180 may select termination over CS access.

Figure 6:
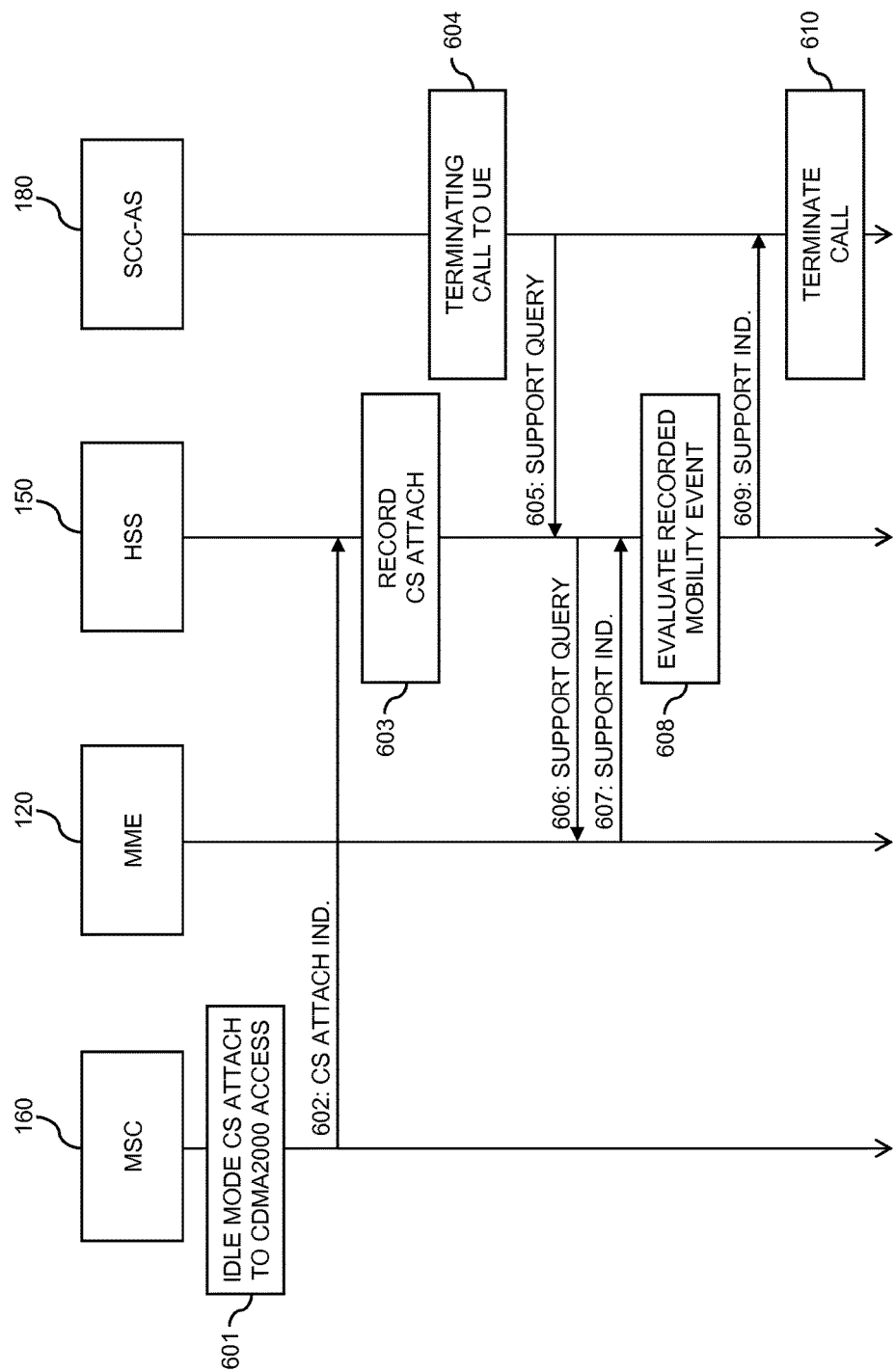
FIG. 6 shows further exemplary procedures in accordance with an embodiment of the invention, which involve termination of a voice call to the UE.

FIG. 6 shows further exemplary procedures for illustrating termination of a call to the UE 300 by the SCC AS 180. The procedures of FIG. 6 involve the MME 120, the HSS 150, and the SCC AS 180. Further, the procedures of FIG. 6 also involve the MSC 160 of the CDMA2000 CS domain.

At step 601, the MSC 160 detects an idle mode CS attach of the UE 300 to a CDMA2000 1×RTT access. By sending CS attach indication 602, the MSC 160 indicates the CS attach to the HSS 150. This may for example be performed in the course of an Update Location procedure for CDMA2000 accesses.

At step 603, the HSS 150 records the indicated CS attach. Various information concerning the CS attach may be recorded, e.g., an indication of the time of the CS attach, the new CS RAT, or the like.

As indicated by step 604, the SCC AS 180 may then need to terminate a voice call to the UE 300.

To obtain information for terminating the voice call, the SCC AS 180 sends a support query 605 to the HSS 150. The HSS 150 sends a further support query 606 to the MME 120. The MME 120 responds to the query 606 with a support indication 607. Specifically, the support indication indicates whether or not IMS voice over PS session is supported for the UE 300 in an LTE access controlled by the MME 120. The support indication 607 also includes a time indication, e.g., corresponding to the time of the UE attaching to an LTE access controlled by the MME 120 or performing a TAU.

At step 608, the HSS 150 may the proceed by evaluating the information from the support indication 607 and mobility events previously recorded at the HSS 150, in particular the CS attach recorded at step 603. Specifically, the HSS 150 may evaluate whether the information concerning the CS attach as recorded at step 603 indicates a younger time than the support indication 607 from the MME 120. If this is the case, the HSS 150 may determine that the UE 300 is currently on a CDMA2000 1×RTT access, without support of IMS voice over PS session. Otherwise, i.e., if the support indication 607 from the indicates a younger time, the HSS 150 may determine the support according to the information indicated by the MME 120.

The HSS 150 then forwards the determined support information to the SCC AS 180, by sending a further support indication 609 to the SCC AS 180.

At step 610, the SCC AS 180 terminates the voice call according to the indicated support information. Specifically, if the indicated support information shows support of IMS voice over PS session, the SCC AS 180 may select termination over PS access. Alternatively, if the indicated support information shows no support of IMS voice over PS session, the SCC AS 180 may select termination over CS access.

In addition to or as a replacement for the above-mentioned timer-based procedure of detecting the idle mode change from LTE to CDMA2000 1×RTT, the UE 300 may also indicate the attachment to the CDMA2000 1×RTT by sending an Short Message (SMS) to the SCC AS 180, e.g., as described in 3GPP2 X.S0042-A, clause 4.2.3. The SCC AS 180 may then also records also the time when the SMS was received, e.g., in the form of a timestamp. If a call to the UE 300 needs to be terminated, the SCC AS 180 may then evaluate the recorded information to decide whether there is a need to query the support of IMS voice over PS session from the HSS 150. If the HSS 150 is queried, the SCC AS 180 can compare the time of the SMS attach indication to the time indicated in the IMS voice over PS session support indication from the HSS 150. The younger indication may then be used by the SCC AS 180 to determine whether IMS voice is possible or whether the call should be terminated over CS access or over PS access.

Figure 7:
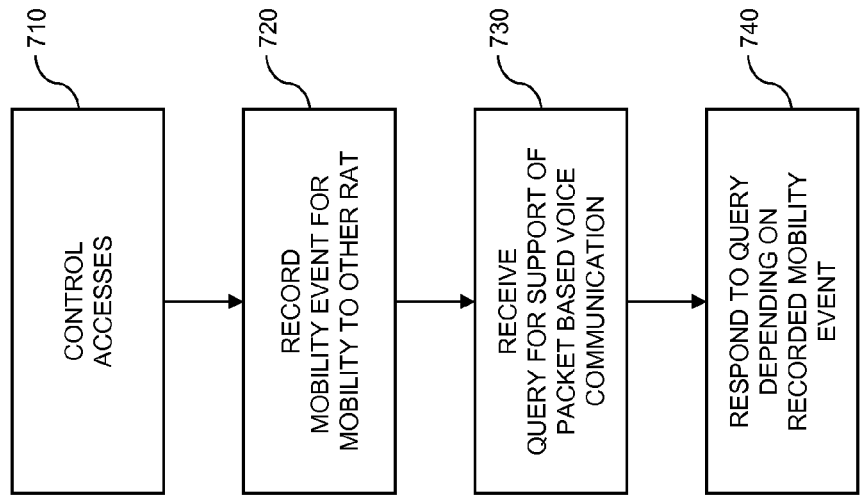
FIG. 7 shows a flowchart for illustrating a method according to an embodiment of the invention.

FIG. 7 shows a flowchart for illustrating a method for controlling communication of a UE in a mobile network with first accesses implemented using a first RAT and second accesses implemented using a second RAT. As mentioned above, the first RAT and the second RAT may be subject to standardization by different bodies, so that co-operative mobility management functionalities between the first RAT and the second RAT are limited or even absent. For example, the first radio access technology may correspond to an LTE radio access technology and the second radio access technology may correspond to a CDMA2000 radio access technology. The method may be used for implementing the above-described concepts in a network node which controls one or more of the first accesses implemented by the first RAT, such as the above-mentioned MME 120.

At step 710, the network node may control the one or more of the first accesses. For example, the network node may interact with the one or more accesses and with other nodes of the mobile network to establish a PDN connection of the UE via one of the first accesses.

At step 720, the network node records at least one mobility event. The mobility event corresponds to movement of the UE from one of the first accesses controlled by the network node to one of the second accesses. The mobility event may for example be a HO in connected mode as in the example of FIG. 2 or may be an idle mode RAT change as in the example of FIG. 4. In the latter case, the mobility event may for example also include removal of a context of the UE, which may be used by the network node to detect the mobility event. Various information concerning the mobility event may be recorded, e.g., a an indication of the time of the mobility event, e.g., in the form of a timestamp, and/or information concerning the RAT after the mobility event.

At step 730, the network node receives a query from a further network node. The further network node may for example correspond to a HSS, e.g., the HSS 150. The query is for information concerning the support of packet based voice communication for the UE when using one of the accesses controlled by the network node, specifically the support of IMS voice over PS session.

At step 740, the network node responds to the query of step 730. This is accomplished depending on the recorded mobility event of step 720. Specifically, if the recorded mobility event indicates that the UE has left the access controlled by the network node to another RAT which does not support the packet based voice communication, the network node may respond by indicating that the packet based voice communication is not supported. For responding to the query of step 730, recorded information concerning the mobility may be evaluated, e.g., a time of the mobility event. In some implementations, the response to the query of step 730 may include an indication of the time of the mobility event. In other cases, the time of the mobility event may be used to select the youngest mobility event among a plurality of recorded mobility events.

In some scenarios, also multiple mobility events may be detected. For example, the network node may record at least one further mobility event corresponding to movement of the UE from one of the second accesses to one of the first accesses controlled by the network node. Accordingly, not only mobility events corresponding to the UE leaving the first RAT may be recorded, but also mobility events corresponding to the UE entering the first RAT. In this way, the further information to determine the currently used RAT and associated support of the packet based voice communication may be obtained. If such further mobility event is recorded, the network node may use the recorded information as a basis for responding to a further query for the support of packet based voice communication. Also concerning the further mobility event various information may be recorded, e.g., an indication of a time of the further mobility event, e.g., in the form of a timestamp. The latter information may for example be utilized by the network node to determine which one of the mobility event and the further mobility event is younger. The youngest one may then be used as a basis for providing the support indication.

Figure 8:
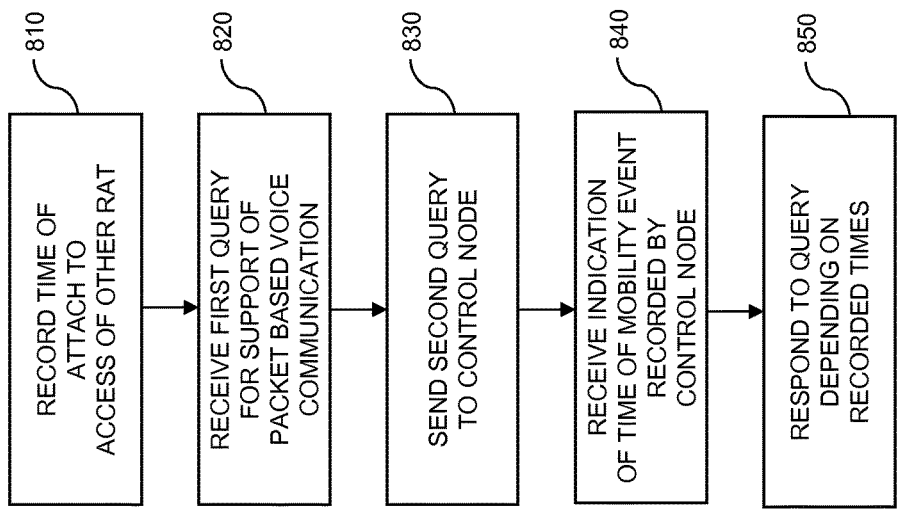
FIG. 8 shows a flowchart for illustrating a further method according to an embodiment of the invention.

FIG. 8 shows a flowchart for illustrating a further method for controlling communication of a UE in a mobile network with first accesses implemented using a first RAT and second accesses implemented using a second RAT. As mentioned above, the first RAT and the second RAT may be subject to standardization by different bodies, so that co-operative mobility management functionalities between the first RAT and the second RAT are limited or even absent. For example, the first radio access technology may correspond to an LTE radio access technology and the second radio access technology may correspond to a CDMA2000 radio access technology. The method may be used for implementing the above-described concepts in a network node which is responsible for providing subscription-related or location related information, such as the above-mentioned HSS 150.

At step 810, the network node records a time of an attach of the UE to one of the second accesses. For example, if the second accesses correspond to CS accesses, the time of the attach may be indicated by an MSC controlling the CS accesses, such as by the MSC 160 controlling the CDMA2000 1xRTT accesses.

At step 820, the network node receives a first query from a first further network node. The first query is for information concerning the support of packet based voice communication for the UE, specifically the support of IMS voice over PS session. The first further network node may be an SCC AS, such as the SCC AS 180.

At step 830, in response to the first query, the network node sends a second query to a second further network node. The second query may be for information concerning the support of packet based voice communication for the UE when using one of the accesses controlled by the second further network node, specifically the support of IMS voice over PS session. The second further network node may correspond to an MME, such as the MME 120.

At step 840, in response to the second query, the network node receives an indication of a time of a mobility event recorded by the second further network node. The mobility event may for example correspond to the UE attaching to one of the first accesses controlled by the second further network node, e.g., in the course of a HO or idle mode mobility from one of the second accesses. Further, the network node may also receive an indication whether voice communication over PS access is supported for the UE in response to the second query.

At step 850, the network node responds to the first query with an indication whether voice communication over packet switched access is supported for the user equipment. This is accomplished depending on the indications of time from steps 810 and 840. Specifically, the indications of time may be compared to determine whether the attach of step 810 or the mobility event of step 840 is younger, and the support may be indicated accordingly.

The methods as described in connection with FIGS. 7 and 8 may be combined with each other in a network system including two or more of the described network nodes. For example, the method of FIG. 7 could be used to provide information on the recorded mobility event to be used as input information in the method of FIG. 8.

Figure 9:
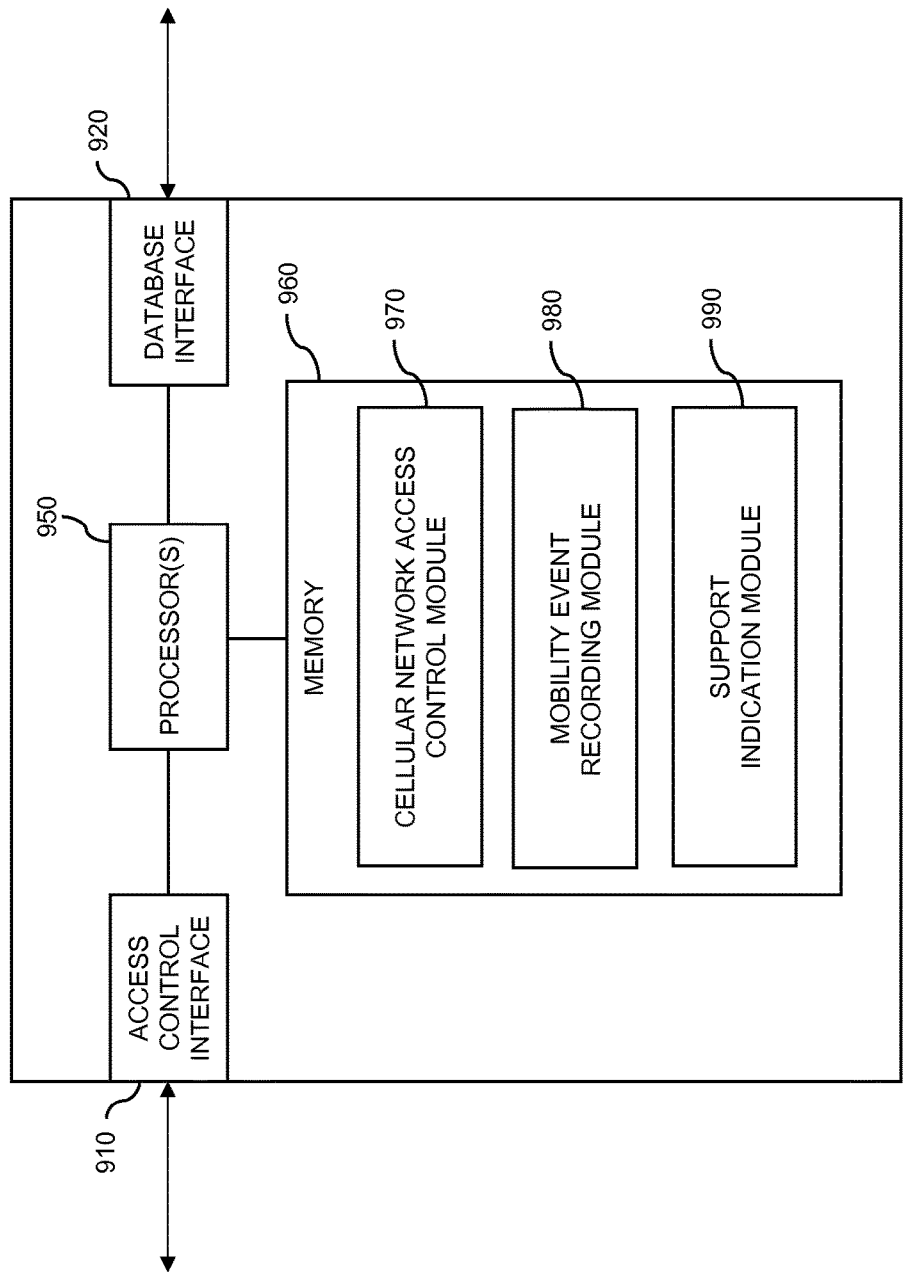
FIG. 9 schematically illustrates a network node according to an embodiment of the invention.

FIG. 9 illustrates exemplary structures for implementation of the above concepts in a network node which is responsible for controlling accesses of one RAT, such as in the MME 120.

As illustrated, the network node may be provided with an access control interface 910 for controlling one or more accesses, e.g., implemented by LTE base stations (eNBs). If the network node has MME functionality, the access control interface 910 is with respect to LTE network accesses, in particular eNBs, and may be implemented by the S1 interface. Further, the network node may be implemented with a database interface 920 for connecting to a subscriber database, such as the HSS 150. If the network node has MME functionality, the database interface 920 may be implemented as the S6a interface.

Further, the network node includes at least one processor 950 coupled to the interfaces 910, 920 and a memory 960 coupled to the at least one processor 950. The memory 960 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 960 includes suitably configured program code to be executed by the processor 960 so as to implement the above-described functionalities of the MME 120 or similar network node. More specifically, the memory 960 may include a cellular network access control module 960 so as to implement the required functionalities for controlling the accesses, e.g., establishing, modifying or releasing a PDN connection, or mobility management functionalities. Further, the memory 960 may include a mobility event recording module 980 so as to implement the above-described functionalities of recording information on a mobility event, e.g., a HO from or to an access controlled by the network node, or idle mode mobility to or from an access controlled by the network node. Further, the memory 960 may include a support indication module 990 so as to implement the above-described functionalities of indicating the support of packet based voice communication with the UE on the accesses controlled by the network node.

It is to be understood that the structures as illustrated in FIG. 9 are merely schematic and that the network node may actually include further components which, for the sake of clarity, have not been illustrated, e.g., further interfaces or additional processors. Also, it is to be understood that the memory 960 may include further types of program code modules which have not been illustrated, e.g., program code modules for implementing known functionalities of an MME. In some implementations, also a computer program may be provided for implementing functionalities of the network node, e.g., in the form of a physical medium storing the program code and/or other data to be stored in the memory 960 or by making the program code available for download.

Figure 10:
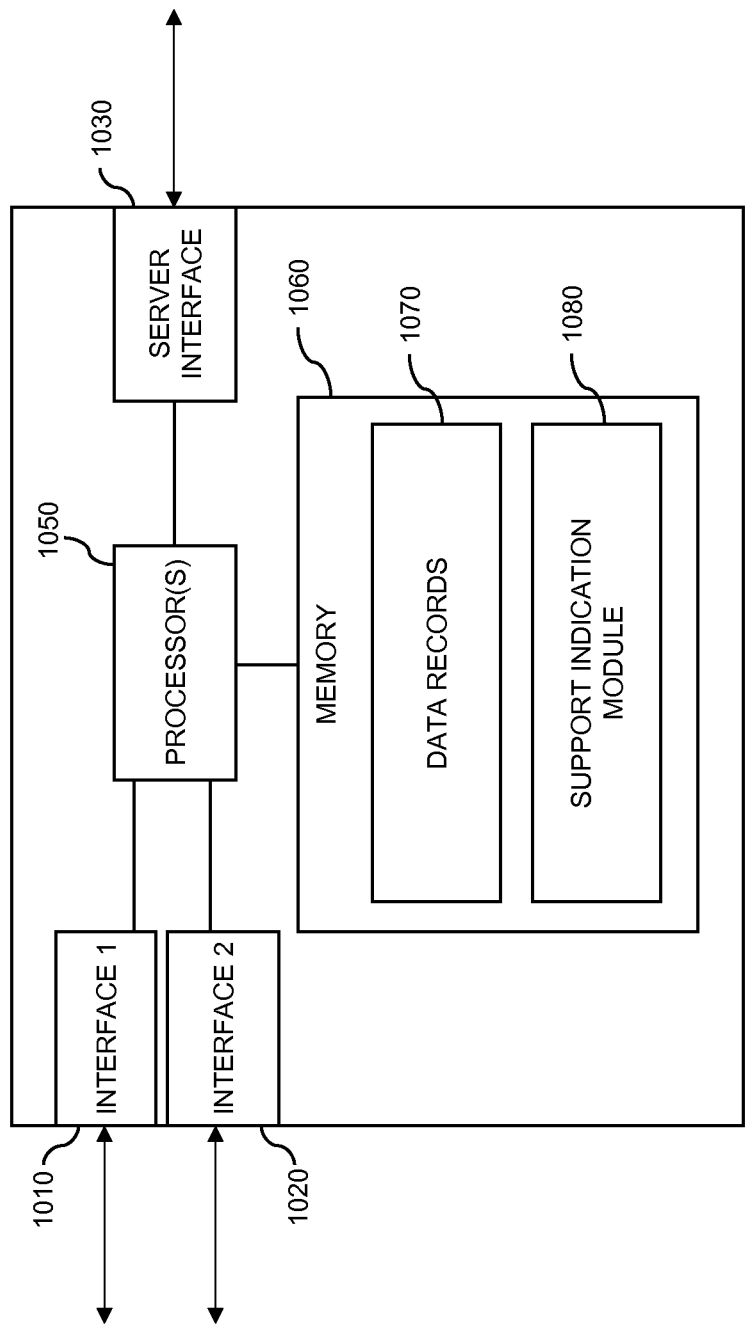
FIG. 10 schematically illustrates a network node according to a further embodiment of the invention.

FIG. 10 illustrates exemplary structures for implementation of the above concepts in a network node which provides various subscription-related or location related information, such as in the HSS 150.

As illustrated, the network node may include a first interface 1010 for interacting with one or more network nodes associated with the first RAT, e.g., MMEs. The first interface 1010 may correspond to the S6a interface between HSS and MME. Further, the network node includes a second interface 1020 for interacting with one or more network nodes associated with the second RAT. For example, such network nodes by have functionalities of an PCF or MSC, e.g., as illustrated in FIG. 1. The second RAN interface 1020 may for example be based on the RADIUS or Diameter protocol.

Further, the network node may include a server interface 1030, which has the purpose of coupling the network node to one or more servers, e.g., the SCC AS 180, or other network functions. The server interface 1030 may be implemented as the Sh interface.

Further, the network node includes at least one processor 1050 coupled to the interfaces 1010, 1020, 1030, and a memory 1060 coupled to the at least one processor 1050. The memory 1060 may include a ROM, e.g., a flash ROM, a RAM, e.g., a DRAM or SRAM, a mass storage, e.g., a hard disk or solid state disk, or the like. The memory 1060 includes data and suitably configured program code to be executed by the processor 1060 so as to implement the above-described functionalities of the HSS 150 or similar network node. More specifically, the memory 1060 may include data records 1070 related to UEs. Such data record may specifically store the indication of support of packet based voice communication with a certain UE or indications of some other supported capability. In addition, such data record may be used to record the time of attach to one of the second accesses. Further, the memory 1060 may include a support determination module 1080 so as to implement the above-described functionalities of determining and indicating the support of packet based voice communication depending on recorded information.

It is to be understood that the structures as illustrated in FIG. 10 are merely schematic and that the network node may actually include further components which, for the sake of clarity, have not been illustrated. Also, it is to be understood that the memory 1060 may include further types of data and program code modules, which have not been illustrated, e.g., program code modules for implementing known functionalities of a HSS. In some implementations, also a computer program may be provided for implementing functionalities of the network node, e.g., in the form of a physical medium storing the program code and/or other data to be stored in the memory 1060 or by making the program code available for download.

As can be seen, the concepts as explained above may be used to allow for efficient implementation T-ADS in mobile networks which combine different RATs with limited mobility co-operation, such as the LTE RAT and with CDMA2000 RATs. Specifically, the concepts may be used to provide the SCC AS with accurate support indications, even if the UE is on a CDMA2000 access or other non-3GPP access. Since the concepts may be implemented without requiring excessive new functionalities in the non-3GPP RAT, implementation of the concepts is facilitated.

It is to be understood that the examples and embodiments as explained above are merely illustrative and susceptible to various modifications. For example, the concepts could be used in various types of mobile network, which are based on different types or combinations of RATs. For example, the concepts may not only be used with respect to the LTE RAT and CDMA2000 RATs, but for example also for other 3GPP RATs and non-3GPP RATs, e.g., UMTS and WiMax. Further, it is to be understood that the above concepts may be implemented by using correspondingly designed software in existing network devices, or by using dedicated network device hardware. Also, it is to be understood that each of the illustrated nodes may be implemented as single device or by multiple interacting devices, e.g., by a device cloud or other kind of distributed system.

The invention claimed is:

1. A method for controlling communication of a user equipment in a mobile network providing a first access to the mobile network implemented by a packet switched radio access technology and a second access to the mobile network implemented by a circuit switched radio access technology, the method comprising:

establishing, at a Mobility Management Entity (MME) network node of the mobile network, a packet-switched bearer between the MME network node and the user equipment;

recording, at the MME network node, information of a mobility event corresponding to movement of the user equipment from the first access, the first access being controlled by the MME network node, to the second access, the information defining the new radio access technology accessed by the user equipment as the circuit switched radio access technology of the second access;

responsive to recording the mobility event, determining, at the MME network node, that the second access does not support the packet switched radio access technology;

responsive to determining that the second access does not support packet switched radio access technology, suspending the packet-switched bearer between the MME network node and the user equipment;

responsive to determining that the second access does not support packet switched radio access technology, recording, at the MME network node, an indication that voice communication over the packet switched radio access technology is not supported for the user equipment;

receiving, at the MME network node and after recording the indication, a query from a Home Subscriber Server (HSS) network node, the query inquiring whether voice communication over the packet switched radio access technology is supported for the user equipment;

responsive to receiving the query, transmitting, by the MME network node, the recorded indication, to the HSS network node, recording, at the MME network node, a further mobility event corresponding to movement of the user equipment from the second access to the first access controlled by the MME network node, responsive to recording the further mobility event, recording, at the MME network node, a further indication that voice communication over the packet switched radio access technology is supported for the user equipment, and responsive to recording the further mobility event, resuming the suspended packet-switched bearer between the MME network node and the user equipment.

2. The method according to claim 1 wherein recording the indication comprises recording, at the MME network node, a time of the mobility event, and wherein transmitting, by the MME network node, the recorded indication further comprises transmitting the recorded time of the mobility event to the HSS network node.

3. The method according to claim 1, wherein the mobility event comprises the user equipment performing a handover from the first access to the second access.

4. The method according to claim 1, wherein the mobility event comprises removal of a context of the user equipment by a packet data gateway of the mobile network.

5. The method according to claim 1, comprising:

receiving, at the MME network node and after recording the further indication, a further query from the HSS network node inquiring whether voice communication over the packet switched radio access technology is supported for the user equipment; and responsive to receiving the further query, transmitting, by the MME network node, the further indication, to the HSS network node.

6. The method according to claim 5, wherein recording the further indication comprises recording, at the MME network node, a time of the further mobility event corresponding to the movement of the user equipment from the second access to the first access controlled by the MME network node, and wherein transmitting, by the MME network node, the recorded further indication further comprises transmitting the recorded time of the further mobility event.

7. The method according to claim 1, wherein the packet switched radio access technology corresponds to an LTE radio access technology and the circuit switched radio access technology corresponds to a CDMA2000 circuit switched radio access technology.

8. A computer program product comprising a non-transitory computer readable storage medium storing program code to be executed by at least one processor of a MME network node of a mobile network providing a first access implemented by a first radio access technology and a second access implemented by a second radio access technology, wherein execution of the program code by the at least one processor causes the MME network node to perform a method according to claim 1.

9. A Mobility Management Entity (MME) network node of a mobile network providing a first access implemented by a packet switched radio access technology and a second access implemented by a circuit switched radio access technology, the MME network node comprising:

a first interface for controlling the first access;

a second interface for interacting with a Home Subscriber Server (HSS) network node of the mobile network; and at least one processor, wherein the at least one processor is configured to:

establish a packet-switched bearer between the MME network node and the user equipment;

record information of a mobility event corresponding to movement of the user equipment from the first access, the first access controlled by the MME network node, to the second access, the information defining the new radio access technology accessed by the user equipment as the circuit switched radio access technology of the second access;

in response to the recordation of the mobility event, determine that the second access does not support the packet switched radio access technology;

in response to the determination that the second access does not support the packet switched radio access technology, suspend the packet-switched bearer between the MME network node and the user equipment;

in response to the determination that the second access does not support the packet switched radio access technology, record an indication that voice communication over the packet switched radio access technology is not supported for the user equipment;

receive a query from the (HSS) network node after the recordation of the indication, the query inquiring whether voice communication over a packet switched access technology is supported for the user equipment;

in response to the reception of the query, transmit the recorded indication, to the HSS network node, record a further mobility event corresponding to movement of the user equipment from the second access to the first access controlled by the MME network node, in response to the recordation of the further mobility event, resume the suspended packet-switched bearer between the MME network node and the user equipment, and in response to the recordation of the further mobility event, record, at the MME network node, a further indication that voice communication over the packet switched radio access technology is supported for the user equipment.

10. The MME network node according to claim 9, wherein the at least one processor is further configured to:

record a time of the mobility event, wherein transmitting, by the MME network node, the recorded indication further comprises transmitting the recorded indication of the time of the mobility event.

11. The MME network node according to claim 9, wherein the mobility event comprises the user equipment performing a handover from the first access to the second access.

12. The MME network node according to claim 9, wherein the mobility event comprises removal of a context of the user equipment by a packet data gateway of the mobile network.

13. The MME network node according to claim 9, wherein the at least one processor is configured to:

receive a further query from the HSS network node after the recordation of the further indication, the further query inquiring whether voice communication over a packet switched access technology is supported for the user equipment, and in response to the reception of the further query, transmit the further indication to the HSS network node.

14. The MME network node according to claim 13, wherein the at least one processor is configured to:

record a time of the further mobility event, and transmit the recorded time of the further mobility event to the HSS network node.

15. The network node according to claim 9, wherein the packet switched radio access technology corresponds to an LTE radio access technology and the circuit switched radio access technology corresponds to a CDMA2000 radio access technology.

* * * * *